United States Patent
Sijbring

[15] 3,636,939
[45] Jan. 25, 1972

[54] METHOD AND APPARATUS FOR THERMALLY TREATING VEGETATIVE MATERIALS

[72] Inventor: Pieter Herman Sijbring, Rhenen, Netherlands

[73] Assignee: Institute Voor Bewaring en Verwerking Van Landbouwprodukten, Wageningen, Netherlands

[22] Filed: Aug. 14, 1969

[21] Appl. No.: 850,076

[30] Foreign Application Priority Data

Aug. 16, 1968 Netherlands..........................6811715

[52] U.S. Cl. ............................................126/271.2 R, 56/1
[51] Int. Cl. .........................................................A01m 21/04
[58] Field of Search ................126/271.2, 271.2 A, 271.2 C; 47/1.3; 56/1

[56] References Cited

UNITED STATES PATENTS

| | | | |
|---|---|---|---|
| 788,582 | 5/1902 | Fairchild et al.................126/271.2 A |
| 923,421 | 6/1909 | Driscoll et al...................126/271.2 A |
| 1,669,614 | 5/1928 | Hext ...............................126/271.2 A |
| 2,639,553 | 5/1953 | Russell.................................47/1.3 X |
| 3,382,864 | 5/1968 | Fannin et al. ...................126/271.2 A |
| 3,442,262 | 5/1969 | Porterfield et al. .............126/271.2 A |

Primary Examiner—Charles J. Myhre
Attorney—Arnold Robinson

[57] ABSTRACT

Vegetative materials are thermally treated, before or during mowing, by directing a mixture of flue gases and steam on said materials to sufficiently damage the cell structure thereof causing a substantial loss in turgescence.

8 Claims, 1 Drawing Figure

PATENTED JAN 25 1972 3,636,939
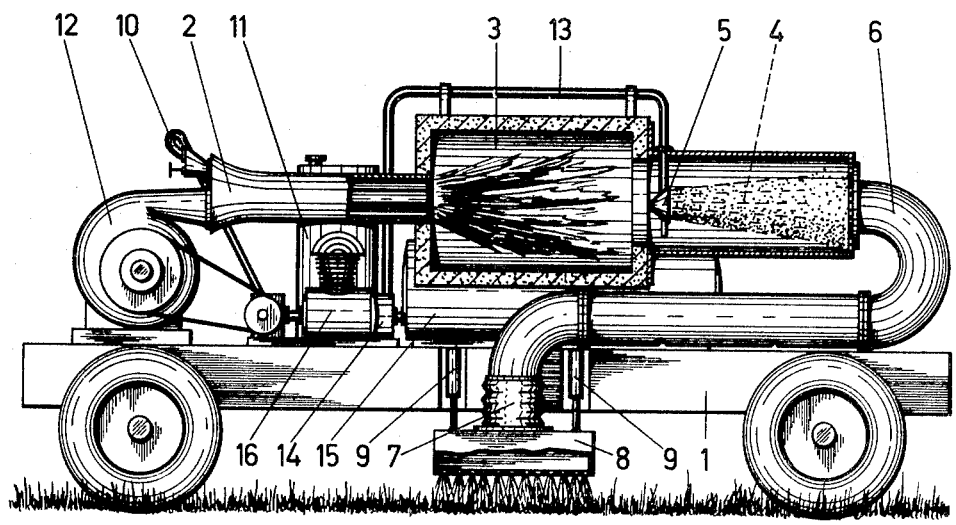

METHOD AND APPARATUS FOR THERMALLY TREATING VEGETATIVE MATERIALS

The invention relates to a method and apparatus for heat-treating vegetative materials by subjecting the latter to the influence of hot gases during mowing or after cutting of such materials in the fields to the extent that the cellular structure is damaged causing substantial loss in turgescence.

Such a pretreatment has recently been used in drying fodder, such as grass, leguminosae and beet leaves in order to decrease the weight of the product to be transported to the drying plant, the drying period, and the energy consumption in the drying plant. After the product or crop has been mowed or cut, it need not be left lying on the field for long periods of time under drying weather conditions. This lying on he field has the disadvantage that natural biological processes in the mown or cut material will only come to a stop gradually, so that i.a., sugars at first are still broken down to change into volatile substances, causing the quantity of solids to decrease by 3–5 percent by weight per 24 hours and 10–25 percent of the carotene present in the fresh material to be lost, thereby decreasing the feeding value.

In addition to the above the method of the present invention may be used to inhibit the growth of vegetative products, which economizes in the upkeep of various areas of vegetation, such as lawns, slopes, grass-verges, banks of ditches and airfields.

The heat treatment interferes with the natural condition of the cells of surface crops. This causes the product to lose the greater part of its fluid content under drying conditions. After treatment according to the present invention, generally a few hours will suffice in drying weather to get rid of a large amount of water.

The evaporation of water in the fields is of great importance for various reasons. Where green crops are concerned, artificial drying will consume less time and energy, and the cost of transport will also be lower. Where products such as peas and beans are concerned, the large amount of water evaporation in the fields will result in less material to be transported and the subsequent handling of the product is also considerably simplified. As regards some products, for example potatoes, peas and beans, the quick drying of the leaves offers the additional advantage that any germs and mildew cannot develop so easily, and this prevents the diseases from spreading through the harvested crops.

Until recently, the heat treatment was carried out with the aid of fuel oil burners, said burners being directed on the products at an oblique slant with respect to the direction of movement of the burners. It has been found that this method results in a poor yield. Only about 10 percent of the heat input or calories supplied is utilized to increase the damaging effect on the cellular structure of the product. Moreover, the product is in direct contact with the flame, causing any dry material (for example paper on the grass-verges) to catch fire.

Experiments have also shown that a considerably higher and better result is obtained if steam is used to supply the vegetative products with calories. An efficient steam generator for this purpose would have to supply in practice 2 to 3 tons of steam per hour. A boiler required for these purposes would be too heavy and impractical.

The present invention seeks to eliminate the disadvantages of the aforementioned methods and to provide a method which is practical and which may utilize apparatus which is not too heavy and which has a high-thermal output.

According to the present invention a mixture of flue gases and steam is used to supply the hot gases for the intended purpose. When using this method, any risk of fire is eliminated and this also makes it possible to repeat the thermal treatment.

A suitable apparatus for carrying out the method according to the invention comprises a vehicle which is provided with a gas or oil burner, a combustion chamber opening out into said burner and debouching into an evaporating chamber into which one or more water supply nozzles have been mounted in such a way that a flame in the combustion chamber is adapted to give off part of its heat to the water flowing from said nozzles in order to maintain the temperature inside the combustion chamber at the required value, and a distributor for the distribution of a mixture of flue gases and steam on a predetermined surface to supply said mixture in the direction of the bottom, said distributor being connected to the evaporating chamber.

In order to obtain the right flame temperature in the combustion chamber in using the normal quantity of air without any great loss of heat, it is of great importance that there be a direct transfer of heat by radiation to the water supplied.

It will be clear that the temperature and the kinetic energy of the flue gas-steam mixture directed towards the product to be treated has to be chosen with an eye to the kind of product in order to inhibit the turgescence in as large a proportion of the product as possible, and yet without killing the product itself. Important factors are the relative proportion between the flue gas and the steam, the correct dimensions of the discharge openings of the distributor, and the height of the distributor above the bottom surface. The travelling speed is also of importance.

The height of the distributor is especially important in view of the variable range of activity. That is why the distributor has preferably been constructed with a vertical adjusting device.

The discharge openings of the distributor should have such dimensions that the mixture may flow from the distributor at a fairly high speed (for instance, 15 m./second). The distributor will offer quite a resistance to the flow of the mixture. In order to obtain an efficient pressure of the mixture notwithstanding said resistance, it is desirable to provide means for raising the pressure, like a booster, in front of the distributor.

Any water which has not evaporated and which collects in the form of large drops near the discharge of the evaporating chamber, may, if desired, be collected in a filter containing suitable filter material, such as Raschig rings; said filter being hot, so that the water will have an opportunity to evaporate. It is also possible to shake this water off and pump it back again for reuse.

The invention will now be explained more fully with reference to the accompanying drawing which shows schematically an embodiment of the invention, partly in elevation and partly in cross section.

The apparatus in the drawing comprises a vehicle 1 having mounted thereon a number of devices for the preparation of and for the supply and discharge of a flue gas-steam mixture in the direction of the bottom of the vehicle.

An oil burner 2 opens in an insulated combustion chamber 3 in which an oil-air mixture, supplied via the burner, may burn. An evaporating chamber 4 opens immediately into the combustion chamber 3. In said evaporating chamber 4 the water supplied by the nozzle 5 in an atomized state will evaporate resulting in a mixture of steam and flue gases. A supply pipe 6 extends from the evaporating chamber 4. The downstream section of said pipe 6 comprises a flexible section 7 opening into a distributor 8 which may be moved in a vertical direction by means of hydraulic cylinders 9. If the position of the distributor 8 needs but a slight adjustment above the ground, more simple adjusters may be used instead of the cylinders 9.

The burner 2 is connected to an oil tank 11 via an oil supply conduit 10 and a pump not shown in the drawing. Furthermore, a booster or fan 12 is mounted in the air supply to the burner. The nozzle 5 is connected to a water tank 15 via a pipe 13 and a water pump 14. The oil pump, the water pump 14 and the booster 12 are driven by the motor 16.

In operation, the vehicle is moved along by a tractor at a constant speed, while a mixture of flue gases and steam is discharged by the distributor 8 onto the vegetative products present underneath the distributor. This mixture is supplied by the pipe 6 from the evaporating chamber. In said evaporating chamber, the water which is fed therein in an atomized state via the tank 15, the pump 14, the pipe 13 and the nozzle 5 is evaporated. The heat required for the evaporization is supplied from the combustion chamber 3 in which the combustion of oil with air takes place. About 25 percent of the heat is transferred by radiation in order to attain the desired flame temperature. A overly high-flame temperature (poor heat dissipation) would have a detrimental effect on the insulated combustion chamber, whereas a too low-flame temperature (too much heat dissipation) would result in incomplete combustion.

The distributor 8 comprises a rather broad box (the width, for example, may be 3 to 4 meters), the bottom of which is provided with a large number of orifices. In the path of the steam-flue gas mixture, the orifices form quite a resistance (for instance, 60 mm. of hydraulic pressure). The booster 12 is provided to raise the pressure in the system in order to obtain a proper flow of the gas mixture in spite of the aforesaid resistance.

The hot gas mixture is used to damage the cellular structure of certain products in the desired aboveground portion of the product, and to interfere with the turgescence without actually killing the product. It may be the object of this thermal treatment to change the drying properties of the products on the stem, so that part of the fluid may evaporate in the fields after the treatment. The evaporation on the fields is important for various purposes.

Where green fodder is concerned, artificial drying will save time and energy, while the costs of transport will be lower too. In the case of products like peas and beans, the large amount of evaporation in the fields result in less material to be transported, and in addition to this, the further handling of the product is considerably simplified. With certain products, such as potatoes, peas, and beans, the quick drying of the leaves also has the advantage that germs and fungi have less chance to develop, preventing the spread of diseases to the harvested product. Furthermore, the thermal treatment of products in the fields by means of hot gases may be used as growth inhibiting methods on various areas such as slopes, grass-verges, banks of ditches and airfields.

The temperature of the mixture and the rate with which the mixture descends on the product are important. The choice of both values depends on the nature of the product. The temperature of the mixture will generally vary from 110° to 500° C. The exit velocity of the gas mixture from the distributor 8 will generally be between 10 to 35 m./second; a speed of about 25 m./second was deemed to be the most propitious for making hay in Holland.

Important values in adjusting the temperature and the speed with which the gases penetrate into the product are the relative proportions between the water and flue gas and the height of the distributor 8 above the land level. The latter value is particularly important with a view to the simple adjustability. The distance between the bottom of the distributor and land level may be, for example, 15–75 cm.

The higher the temperature of the gas mixture, the more flue gas present in the mixture, and the less water to be carried. A lower water content in the mixture of flue gas-steam produces a lower thermal efficiency, however. In practice about 6–13 kg. of water is used per kg. of oil burned. interdependence.

A decrease in temperature of the mixture will signify an increase in the relative amount of water, the volume remaining about the same, but the weight of the mixture increases per unit per unit of value, and the kinetic energy with which the hot gas mixture meets the product will be increased. The most suitable temperature and the most desirable speed of the gas mixture thus show a certain interdependence.

The travelling speed of the vehicle should also be carefully determined.

The distributor may also — as seen from the direction of travel — be mounted either behind or in front of the vehicle. In case the product has been flattened by one or more of the wheels of the vehicle before the thermal treatment has been carried out, the use of reels or the like for raising the flattened products before they are touched by the hot gases may be advantageous for increasing the effect of the treatment.

The water will generally be ejected as a conical spray by the nozzle 5. If large drops of water land near the discharge of the evaporating chamber, a filter may be provided in the vicinity of said discharge comprising fillers, such as Raschig rings. In the filter the collected water may evaporate yet.

It is not always necessary for all the required amount of water to be supplied to the evaporating chamber; for instance, in addition to the nozzle 5, shown in the drawing, one or more supply nozzles may be provided in the pipe 6.

It will be clear that the embodiment described and schematically shown in the drawing is only an example. A great many alterations may be made within the framework of the invention. The adjustment of the distributor 8, for example, may be controlled by various means.

EXAMPLE

Part of a parcel of pastureland under drying weather conditions was thermically treated by means of an apparatus according to the invention. The apparatus comprised a distributor with a width of 3 m. This distributor had been set 30 cm. above the pastureland and a mixture of flue gas and steam was ejected by the distributor onto the product. The temperature of said mixture was 250° C., while the mixture was ejected by the distributor at a speed of 15 m./second. One thousand one hundred kg. of water and 120 kg. of oil were used per hectare. The apparatus was moved along at a rate of 4 km./hour. Time of treatment noted was 48 minutes per hectare.

Two hours after the thermical treatment, the product was mown and straightaway transported to the drying plant. The field yielded 11 tons of material per hectare, the moisture content being 270 percent by weight (based on the dry matter). This material was dried in a drum drier until 3.85 tons of material had been obtained with a moisture content of 11.3 percent by weight. This took 153 minutes for the material yielded by 1 hectare, 765 kg. of fuel oil being used in the process. The total consumption of oil thus amounted to 885 kg. per hectare.

For comparison's sake, another part of the same product was thermically treated by driving across it with an apparatus comprising 20 burners at an operational width of 3.20 m. at a height of 35 cm. above the mowing field. The travelling speed was 4 km./hour and 250 kg. of oil were consumed per hectare. The product was again mowed 2 hours after the thermical treatment, and transported to the drying plant straightway. The drying in the drying plant produced substantially the same results as with the product which had been treated with a flue gas-steam mixture.

Finally, still another part of the same product was mown and transported to the drying plant at once without a previous thermical treatment. The yield was 17.3 tons of grass per hectare, said grass having a moisture content of 480 percent by weight. This grass was dried in a similar rotary drying drum until 3.22 tons of material had been obtained with a moisture content of 10.8 percent by weight. This took 281 minutes for the material yielded by 1 hectare, 1,408 kg. of fuel oil being consumed in the process.

I claim:

1. A method of thermically treating vegetable materials before or during mowing to damage the cell structure thereof and to cause a substantial loss in turgescence which comprises the steps of forming a mixture of flue gas and steam by burning a hydrocarbon fuel and evaporating between about 6 to 13 kg. of water for each kg. of combustible hydrocarbon fuel to form the mixture and directing said mixture against the vegetable material to be treated.

2. The method specified in claim 1 which includes the step of burning a fuel oil.

3. Vehicle for thermically treating vegetative materials comprising a combustion chamber having a burner mounted thereon, an evaporation chamber opening into said combustion chamber and receiving combustion products from the said combustion chamber, nozzle means for introducing water into said evaporation chamber, said nozzle means being in position to have the water receive radiant heat from the flame in the combustion chamber in order to reduce the temperature in said combustion chamber, and a distributor in communication with said evaporating chamber for receiving the resulting mixture of flue gas and steam from said evaporation chamber and direct said mixture onto said vegetative materials.

4. Apparatus according to claim 3, wherein said combustion chamber and evaporation chamber are longitudinally aligned and the combustion chamber has a discharge opening which is aligned with the evaporation chamber inlet opening, said nozzle means being disposed adjacent the evaporation chamber inlet opening and on the longitudinal axis of said chambers.

5. Apparatus according to claim 3, wherein means are provided for vertically adjusting the position of said distributor relative to said vehicle.

6. Apparatus according to claim 3, wherein said evaporation chamber is connected to said distributor by a duct and a flexible means is provided in said duct to facilitate vertical adjustment of said distributor.

7. Apparatus according to claim 3, further comprising means for raising the pressure of said mixture at the inlet to said distributor.

8. Apparatus according to claim 7, wherein said means for raising the pressure of said mixture comprises a fan discharging air into said combustion chamber.

* * * * *